United States Patent
Hu et al.

(10) Patent No.: US 11,978,231 B2
(45) Date of Patent: May 7, 2024

(54) WRINKLE DETECTION METHOD AND TERMINAL DEVICE

(71) Applicant: HONOR DEVICE CO., LTD., Guangdong (CN)

(72) Inventors: Hongwei Hu, Shenzhen (CN); Chen Dong, Shenzhen (CN); Xin Ding, Shenzhen (CN); Wenmei Gao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 440 days.

(21) Appl. No.: 17/295,230

(22) PCT Filed: Nov. 13, 2019

(86) PCT No.: PCT/CN2019/117904
§ 371 (c)(1),
(2) Date: May 19, 2021

(87) PCT Pub. No.: WO2020/103732
PCT Pub. Date: May 28, 2020

(65) Prior Publication Data
US 2021/0390688 A1 Dec. 16, 2021

(30) Foreign Application Priority Data
Nov. 19, 2018 (CN) .......................... 201811375119.1

(51) Int. Cl.
*G06T 7/73* (2017.01)
*G06T 7/00* (2017.01)
(Continued)

(52) U.S. Cl.
CPC .............. *G06T 7/73* (2017.01); *G06T 7/0012* (2013.01); *G06V 10/25* (2022.01); *G06V 40/166* (2022.01);
(Continued)

(58) Field of Classification Search
CPC ..................... G06T 7/73; G06T 7/0012; G06T 2207/30201; G06T 2207/20012;
(Continued)

(56) References Cited

U.S. PATENT DOCUMENTS 8,144,997 B1 * 3/2012 Ding ...................... H04N 19/59
382/284
11,521,334 B2 * 12/2022 Luo .......................... G06T 11/60
(Continued)

FOREIGN PATENT DOCUMENTS

CN 102129698 A 7/2011
CN 103827916 A 5/2014
(Continued)

OTHER PUBLICATIONS

Extended European Search Report issued in European Application No. 19888055.1 dated Jan. 3, 2022, 9 pages.
(Continued)

*Primary Examiner* — Santiago Garcia
(74) *Attorney, Agent, or Firm* — Fish & Richardson P.C.

(57) ABSTRACT

A wrinkle detection method includes: obtaining an original image, where the original image includes a face; adjusting a size of an ROI region on the original image to obtain at least two ROI images of different sizes, where the ROI region is a region in which a wrinkle on the face is located. A terminal device processes all the at least two ROI images of different sizes to obtain at least two binary images, where a white region in each binary image is a region in which a wrinkle is suspected to appear. The terminal device fuses the at least two binary images to obtain a final image, where a white region on the final image is recognized as a wrinkle.

20 Claims, 11 Drawing Sheets

(51) Int. Cl.
*G06V 10/25* (2022.01)
*G06V 40/16* (2022.01)

(52) U.S. Cl.
CPC .. *G06V 40/171* (2022.01); *G06T 2207/30201* (2013.01)

(58) Field of Classification Search
CPC ...... G06T 5/002; G06V 10/25; G06V 40/166; G06V 40/171
See application file for complete search history.

(56) References Cited

U.S. PATENT DOCUMENTS

| | | | |
|---|---|---|---|
| 2011/0206254 A1* | 8/2011 | Patwardhan | A61B 5/441 382/128 |
| 2014/0205159 A1* | 7/2014 | Yoshida | G06T 7/13 382/118 |
| 2015/0086104 A1* | 3/2015 | Miyamoto | C12Q 1/68 382/133 |
| 2015/0161466 A1* | 6/2015 | Welinder | G06V 10/25 382/195 |
| 2015/0351682 A1* | 12/2015 | Yamanashi | G06T 7/0012 382/128 |
| 2016/0162728 A1* | 6/2016 | Arai | G06V 10/443 382/118 |
| 2016/0371537 A1 | 12/2016 | He | |
| 2017/0020436 A1* | 1/2017 | Flament | G06V 40/166 |
| 2017/0035286 A1* | 2/2017 | Meyer | A61B 3/0025 |
| 2017/0303790 A1* | 10/2017 | Bala | G06T 7/11 |
| 2019/0080162 A1* | 3/2019 | Shen | G06T 7/0014 |
| 2020/0020071 A1* | 1/2020 | Frey | G06T 3/0056 |
| 2020/0380674 A1* | 12/2020 | Ding | G06T 7/0012 |
| 2021/0256314 A1* | 8/2021 | Javidi | G06F 18/2148 |
| 2021/0390688 A1 | 12/2021 | Hu et al. | |
| 2022/0148161 A1* | 5/2022 | Guo | G06T 7/90 |

FOREIGN PATENT DOCUMENTS

| | | |
|---|---|---|
| CN | 105184216 A | 12/2015 |
| CN | 105310690 A | 2/2016 |
| CN | 105407799 A | 3/2016 |
| CN | 107330370 A | 11/2017 |
| CN | 108324247 A | 7/2018 |
| CN | 108369644 A | 8/2018 |
| CN | 111199171 A | 5/2020 |
| EP | 2759981 A1 | 7/2014 |
| EP | 3809361 A1 | 4/2021 |
| JP | 2005092349 A | 4/2005 |

OTHER PUBLICATIONS

Marcos et al., "Nonverbal Communication with a Multimodal agent via Facial Expression Recognition," 2011 IEEE International Conference on Robotics and Automation (ICRA), May 2011, 6 pages.

Ng et al., "Hybrid Ageing Patterns for Face Age Estimation," Image and Vision Computing, vol. 69, Jan. 2018, 11 pages.

PCT International Search Report and Written Opinion issued in International Application No. PCT/CN2019/117904 dated Feb. 19, 2020, 12 pages (with English translation).

* cited by examiner

[1, 1, 1, 1, 1, 1, 1, 1, 1, 1, 1, 1, 1, 1, 1,
1, 1, 1, 1, 1, 1, 1, 1, 1, 1, 1, 1, 1, 1, 1,
1, 1, 1, 1, 1, 1, 1, 1, 1, 1, 1, 1, 1, 1, 1,
1, 1, 1, 1, 1, 1, 1, 1, 1, 1, 1, 1, 1, 1, 1,
0, 0, 0, 0, 0, 0, 0, 0, 0, 0, 0, 0, 0, 0, 0,
0, 0, 0, 0, 0, 0, 0, 0, 0, 0, 0, 0, 0, 0, 0,
−2, −2, −2, −2, −2, −2, −2, −2, −2, −2, −2, −2, −2, −2, −2,
−4, −4, −4, −4, −4, −4, −4, −4, −4, −4, −4, −4, −4, −4, −4,
−2, −2, −2, −2, −2, −2, −2, −2, −2, −2, −2, −2, −2, −2, −2,
0, 0, 0, 0, 0, 0, 0, 0, 0, 0, 0, 0, 0, 0, 0,
0, 0, 0, 0, 0, 0, 0, 0, 0, 0, 0, 0, 0, 0, 0,
1, 1, 1, 1, 1, 1, 1, 1, 1, 1, 1, 1, 1, 1, 1,
1, 1, 1, 1, 1, 1, 1, 1, 1, 1, 1, 1, 1, 1, 1,
1, 1, 1, 1, 1, 1, 1, 1, 1, 1, 1, 1, 1, 1, 1,
1, 1, 1, 1, 1, 1, 1, 1, 1, 1, 1, 1, 1, 1, 1]

WRINKLE DETECTION METHOD AND TERMINAL DEVICE

CROSS-REFERENCE TO RELATED APPLICATIONS

This application is a National Stage of International Application No. PCT/CN2019/117904, filed on Nov. 13, 2019, which claims priority to Chinese Patent Application No. 201811375119.1, filed on Nov. 19, 2018, both of which are hereby incorporated by reference in their entireties.

TECHNICAL FIELD

This application relates to the field of terminal technologies, and in particular, to a wrinkle detection method and a terminal device.

BACKGROUND

With the improvement of people's quality of life, more and more people, especially women, are becoming concerned with their skin conditions. Among them, women are more concerned with skin conditions of the face, for example, whether there are crow's feet around corners of eyes, and whether there are nasolabial folds on the face, and choose to use different skincare products based on these skin conditions.

In the current market, there are some skin detection devices, such as a skin checker. However, these skin detection devices are relatively expensive and need to be used under the guidance of professionals due to complex operations, resulting in poor universality.

SUMMARY

Embodiments of this application provide a wrinkle detection method and a terminal device, to automatically detect wrinkles on user skin, to facilitate user operations and improve user experience.

According to a first aspect, an embodiment of this application provides a wrinkle detection method. The method may be performed by a terminal device. The method includes: The terminal device obtains an original image, where the original image includes a face; the terminal device adjusts a size of an ROI region on the original image to obtain at least two ROI images of different sizes, where the ROI region is a region in which a wrinkle on the face is located; the terminal device processes all the at least two ROI images of different sizes to obtain at least two binary images, where a white region in each binary image is a region in which the wrinkle is suspected to appear; and the terminal device fuses the at least two binary images to obtain a final image, where a white region on the final image is recognized as the wrinkle.

In this embodiment of this application, the terminal device (such as a mobile phone or an ipad) can implement a skin detection function. The terminal device only needs to acquire an image including a face, to detect a wrinkle by using the wrinkle detection method. This facilitates operations and improves user experience. In addition, different processing is performed on an ROI region on an image (including a face) at least twice, so that accuracy of wrinkle detection is improved.

In a possible design, that the terminal device processes all the at least two ROI images of different sizes to obtain at least two binary images includes: for each ROI image, repeatedly performing the following steps by using at least one preset matrix: the terminal device covers the ROI image by using the preset matrix, and determines a pixel value of a pixel that is on the ROI image and that corresponds to each matrix element in the preset matrix; the terminal device determines a product of each matrix element and the pixel value of the pixel corresponding to each matrix element; the terminal device obtains a sum of products corresponding to all the matrix elements, where the sum is a pixel value at a center position of an image block that is on the ROI image and that is covered by the matrix; and the terminal device sets the center position to black if the pixel value of the center position of the image block is greater than a preset pixel value, or the terminal device sets the center position to white if the pixel value of the center position of the image block is less than or equal to the preset pixel value.

In this embodiment of this application, the terminal device processes each ROI image by using the preset matrix, determines pixel values at center positions of different image blocks on each ROI image, sets a center position with a relatively high pixel value to black, and sets a center position with a relatively low pixel value to white. In this way, a white region in a binary image obtained by the terminal device is a region in which the wrinkle is suspected to appear. In this manner, accuracy of wrinkle detection is improved.

In a possible design, before the terminal device fuses the at least two binary images to obtain the final image, if the terminal device further determines that M images of the at least two binary images have a white region at a same position, the terminal device deletes the white region at the position from the M images, where M is less than or equal to a preset value.

In this embodiment of this application, before fusing the at least two binary images, the terminal device may further delete some white regions that meet a condition (for example, if only one binary image has a white region at a position, while there is no white region at this position on other binary images, the white region is deleted). In this manner, accuracy of wrinkle detection is improved.

In a possible design, if the wrinkle is a nasolabial fold, after the white region on the final image is recognized as a wrinkle, the terminal device determines a region in which a beard is located on the final image; the terminal device determines n white regions that intersect the region in which the beard is located; the terminal device determines a ratio of a quantity of pixels in the region in which the beard is located in a first white region of the n white regions to a quantity of all pixels in the first white region; and if the ratio is greater than or equal to a preset ratio, the terminal device deletes the first white region from the final image, where a remaining white region on the final image is recognized as the nasolabial fold.

In this embodiment of this application, after recognizing the wrinkle, the terminal device may further recognize the nasolabial fold. Therefore, the terminal device filters out the nasolabial fold from the recognized wrinkle (for example, filters out, based on the region in which the beard is located, a white region that may be the nasolabial fold). In this manner, accuracy of recognizing the nasolabial fold is improved.

In a possible design, if the wrinkle is a nasolabial fold, after the white region on the final image is recognized as a wrinkle, the terminal device determines a coordinate position of a nose wing in the final image; and the terminal device deletes, from the final image, a white region that is within a preset distance range from the coordinate position and whose length is greater than a preset length, where a remaining white region on the final image is recognized as the nasolabial fold.

In this embodiment of this application, the terminal device may alternatively determine, based on the position of the nose wing, a white region that may be the nasolabial fold, so that accuracy of detecting the nasolabial fold is improved.

In a possible design, the preset ratio is 1−n/m, and m is a preset fixed value.

In a possible design, before the terminal device adjusts the size of the ROI image to obtain the at least two ROI images of different sizes, the terminal device converts the ROI image into a grayscale image; the terminal device horizontally adjusts the grayscale image; and the terminal device denoises the horizontally adjusted image.

In this embodiment of this application, before adjusting the size of the ROI image, the terminal device may further preprocess the ROI image. A preprocessing process includes grayscale processing, horizontal adjustment, denoising processing, and the like. Accuracy of wrinkle detection is improved through the preprocessing.

In a possible design, after white regions on the final image are recognized as wrinkles, the terminal device determines an evaluation result y of the white regions based on the following formula:

$$y = w1*x1 + w2*x2 + w3*x3 + w4*x4 + w5*x5 + w6*x6 + b$$

where x1 represents an average width of the white regions, x2 represents an average length of the white regions, x3 represents an average internal and external color contrast of the white regions, x4 represents a ratio of a quantity of pixels of the white regions to a total quantity of pixels of the ROI image, x5 and x6 respectively represent a length and a width of a longest white region in the white regions, and b represents a bias.

In this embodiment of this application, after detecting the wrinkles, the terminal device may evaluate the wrinkles. Through the foregoing formula, an evaluation result of the wrinkles can be determined relatively accurately.

In a possible design, before the terminal device obtains the original image, the terminal device detects a first operation, runs a first application, turns on a camera, and displays a viewfinder interface; and after the terminal device recognizes the wrinkle in the final image, the terminal device displays notification information in the viewfinder interface, where the notification information is used to notify a position of the wrinkle on the face.

In this embodiment of this application, the terminal device may integrate the wrinkle detection function into the first application. The first application may be an application built in the terminal device, for example, a camera application, or an application independently configured to detect skin, or may be an application downloaded from a network side in a use process of the terminal device. After recognizing the wrinkle, the terminal device may notify the user of the position of the wrinkle on the face. In this way, it is convenient for a person, especially a woman, to manage skin, operations are facilitated, and user experience is improved.

In a possible design, before the terminal device obtains the original image, the terminal device is in a screen-locked state; after the terminal device recognizes the wrinkle in the final image, the terminal device compares the wrinkle with a wrinkle in a prestored image; and if the two are consistent, the terminal device performs screen unlocking.

In this embodiment of this application, the wrinkle detection function may be applied to the face unlocking field. After acquiring the image and recognizing the wrinkle in the image, the terminal device may compare the wrinkle with the wrinkle in the prestored image, and unlock the device if the two are consistent. In this manner, device security is improved.

In a possible design, before the terminal device obtains the original image, the terminal device displays a payment verification interface; and
  after the terminal device recognizes the wrinkle in the final image, the terminal device compares the wrinkle with a wrinkle in a prestored image; and if the two are consistent, the terminal device performs a payment process.

In this embodiment of this application, the wrinkle detection function may be applied to the face payment field. After acquiring the image and recognizing the wrinkle in the image, the terminal device may compare the wrinkle with the wrinkle in the prestored image, and perform the payment process if the two are consistent. In this manner, payment security is improved.

In a possible design, when no wrinkle is detected, the terminal device outputs notification information to notify the user that no wrinkle is detected.

In this embodiment of this application, when no wrinkle is recognized, the terminal device may notify the user that no wrinkle is recognized. In this way, it is convenient for a person, especially a woman, to manage skin, operations are facilitated, and user experience is improved.

According to a second aspect, an embodiment of this application further provides a terminal device. The terminal device includes a camera, a processor, and a memory; the camera is configured to acquire an original image, where the original image includes a face; and the memory is configured to store one or more computer programs, where when the one or more computer programs stored in the memory are executed by the processor, the terminal device is enabled to implement the technical solution in any one of the first aspect or the possible designs of the first aspect.

According to a third aspect, an embodiment of this application further provides a terminal device. The terminal device includes modules/units for performing the method in any one of the first aspect or the possible designs of the first aspect. These modules/units may be implemented by hardware, or may be implemented by hardware executing corresponding software.

According to a fourth aspect, an embodiment of this application provides a chip. The chip is coupled to a memory in an electronic device, and performs the technical solution in any one of the first aspect of the embodiments of this application or the possible designs of the first aspect. In the embodiments of this application, "coupling" means that two components are directly or indirectly connected to each other.

According to a fifth aspect, an embodiment of this application provides a computer-readable storage medium. The computer-readable storage medium includes a computer program, and when the computer program is run on a terminal device, the terminal device is enabled to perform the technical solution in any one of the first aspect of the embodiments of this application or the possible designs of the first aspect.

According to a sixth aspect, an embodiment of this application provides a computer program product, including an instruction. When the computer program product runs on a terminal device, the terminal device is enabled to perform the technical solution in any one of the first aspect of the embodiments of this application or the possible designs of the first aspect.

DESCRIPTION OF EMBODIMENTS

Figure 1:
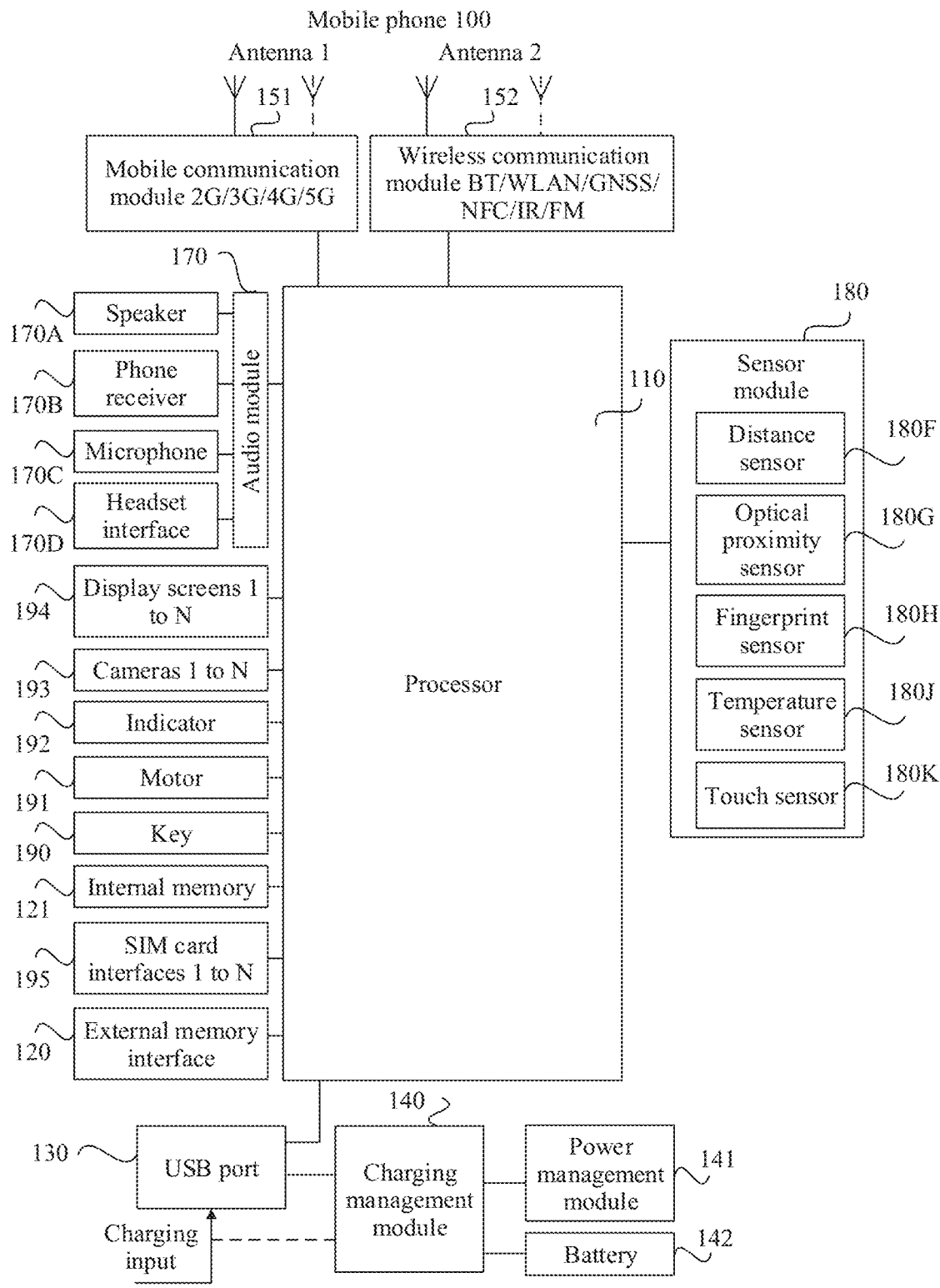
FIG. 1 is a schematic diagram of a mobile phone 100 according to an embodiment of this application.

The following describes the technical solutions in the embodiments of this application with reference to the accompanying drawings in the embodiments of this application.

The following describes some terms in the embodiments of this application, to facilitate understanding for persons skilled in the art.

An application (application, app) in the embodiments of this application is a computer program that can implement one or more specific functions. Generally, a terminal device may be installed with a plurality of applications, such as a camera application, an SMS application, an MMS application, various email applications, a chat software application, and WhatsApp Messenger, Line (Line), Instagram (instagram), Kakao Talk, and a DingTalk application. The application mentioned below may be an application built in the terminal before delivery, or may be an application downloaded by a user from a network side in a process of using the terminal. A wrinkle detection function provided in the embodiments of this application may be integrated into one or more applications, for example, integrated into the camera application or a WeChat application. Using the camera application as an example, the terminal device starts the camera application and displays a viewfinder interface. The viewfinder interface may include a control. When the control is activated, the terminal device may start the wrinkle detection function provided in the embodiments of this application. Using the WeChat application as an example, the terminal device displays an Emoji making interface of WeChat. The Emoji making interface displays a control. When the control is activated, the terminal device may also start the wrinkle detection function provided in the embodiments of this application.

A pixel in the embodiments of this application is a minimum imaging unit on an image. One pixel may correspond to one coordinate point on the image. The pixel may include one parameter (for example, grayscale), or a set of parameters (for example, grayscale, brightness, and color). If the pixel includes one parameter, a pixel value is a value of the parameter. If the pixel includes a set of parameters, a pixel value includes values of the parameters in the set.

An original image in the embodiments of this application is an image of a to-be-photographed object (for example, a face) that is generated based on an optical signal reflected by the to-be-photographed object after a lens group in a camera collects the optical signal. In other words, the original image is an image including a face, but the image is not processed.

A region of interest (region of interest, ROI) region in the embodiments of this application is a partial region determined by the terminal device from the original image. The partial region is a region in which a wrinkle is located, and is referred to as an ROI region. For example, the original image is a face image. The terminal device determines a region in which a nasolabial fold is located in the original image, and the region in which the nasolabial fold is located is an ROI region.

With respect to an ROI image in the embodiments of this application, the ROI region is a partial region on the original image, while the ROI image is an image segmented by the terminal device from the original image based on the ROI region (an image formed by the ROI region). It should be noted that a name of a region in which a wrinkle is located is not limited in the embodiments of this application. For example, the region in which the wrinkle is located may be referred to as an ROI region, or may be referred to as another name. Certainly, the name of the ROI image is not limited, either.

It should be noted that the original image or the ROI image may be used as an input image of a wrinkle detection algorithm provided in the embodiments of this application. A wrinkle in the input image is detected by using the wrinkle detection algorithm provided in the embodiments of this application.

"A plurality of" in the embodiments of this application means two or more.

It should be noted that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects, if without special explanation. In addition, in the descriptions of the embodiments of the present invention, terms such as "first" and "second" are only used for distinguishing and description purposes, and cannot be understood as indicating or implying relative importance, or understood as indicating or implying a sequence.

The following describes a terminal device, a graphical user interface (graphical user interface, GUI) for such a terminal device, and embodiments for using such a terminal device. In some embodiments of this application, the terminal device may be a portable device, for example, a mobile phone, a tablet computer, or a wearable device (for example, a smartwatch) having a wireless communication function. The portable terminal has an image acquisition function and an algorithm operation capability (capable of running the wrinkle detection algorithm provided in the embodiments of this application). An example embodiment of the portable device includes but is not limited to a portable device using iOS®, Android®, Microsoft®, or another operating system. The portable device may alternatively be another portable device, provided that the device can implement the image acquisition function and the algorithm operation capability (capable of running the wrinkle detection algorithm provided in the embodiments of this application). It should be further understood that, in some other embodiments of this application, the terminal device may not be a portable device, but is a desktop computer that can implement the image acquisition function and the algorithm operation capability (capable of running the wrinkle detection algorithm provided in the embodiments of this application).

In some other embodiments of this application, the terminal device may alternatively have the algorithm operation capability (capable of running the wrinkle detection algorithm provided in the embodiments of this application) and a communication function, rather than the image acquisition function. For example, the terminal device receives an image sent by another device, and then runs the wrinkle detection algorithm provided in the embodiments of this application, to detect a wrinkle in the image. The following uses an example in which the terminal device has the image acquisition function and the algorithm operation function.

For example, the terminal device is a mobile phone. FIG. 1 is a schematic structural diagram of a mobile phone 100.

The mobile phone 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 151, a wireless communication module 152, an audio module 170, a speaker 170A, a phone receiver 170B, a microphone 170C, a headset interface 170D, a sensor module 180, a key 190, a motor 191, an indicator 192, a camera 193, a display screen 194, a subscriber identity module (subscriber identification module, SIM) card interface 195, and the like. The sensor module 180 may include a distance sensor 180F, an optical proximity sensor 180G, a fingerprint sensor 180H, a temperature sensor 180J, and a touch sensor 180K (certainly, the mobile phone 100 may further include other sensors, such as a pressure sensor, an acceleration sensor, a gyroscope sensor, an ambient optical sensor, and a bone conduction sensor, not shown in the figure).

It may be understood that the schematic structure in this embodiment of the present invention does not constitute a specific limitation on the mobile phone 100. In some other embodiments of this application, the mobile phone 100 may include more or fewer components than those shown in the figure, or have some components combined, or have some components split, or have a different component arrangement. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors. The controller may be a nerve center and a command center of the mobile phone 100. The controller may generate an operation control signal based on instruction operation code and a timing signal, to complete control on instruction fetching and execution.

A memory may be further configured in the processor 110, to store an instruction and data. In some embodiments, the memory in the processor 110 is a cache. The memory may store an instruction or data that was just used or is cyclically used by the processor 110. If to use the instruction or the data again, the processor 110 may directly invoke the instruction or the data from the memory. This avoids repeated access, and reduces a waiting time of the processor 110, so that system efficiency is improved. The processor 110 may run the wrinkle detection algorithm provided in the embodiments of this application, to detect a wrinkle in an image.

The mobile phone 100 implements a display function by using the GPU, the display screen 194, the application processor, and the like. The GPU is a microprocessor for image processing, and is connected to the display screen 194 and the application processor. The GPU is configured to perform mathematical and geometric calculation, and perform graphics rendering. The processor 110 may include one or more GPUs that execute a program instruction to generate or change display information.

The display screen 194 is configured to display an image, a video, and the like. The display screen 194 includes a display panel. The display panel may use a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a Miniled, a MicroLed, a Micro-oLed, a quantum dot light-emitting diode (quantum dot light emitting diodes, QLED), or the like. In some embodiments, the mobile phone 100 may include one or N display screens 194. N is a positive integer greater than 1.

The camera 193 (a front-facing camera or a rear-facing camera) is configured to capture a static image or a video. Generally, the camera 193 may include a photosensitive element, for example, a lens group and an image sensor. The lens group includes a plurality of lenses (convex lenses or concave lenses), and is configured to collect an optical signal reflected by a to-be-photographed object (for example, a face), and transfer the collected optical signal to the image sensor. The image sensor generates an image (for example, a face image) of the to-be-photographed object based on the optical signal. Using the face image as an example, after acquiring the face image, the camera 193 may send the face image to the processor 110. The processor 110 runs the wrinkle detection algorithm provided in the embodiments of this application, to detect a wrinkle on the face image. After the processor 110 determines the wrinkle on the face image, the display screen 194 may display notification information of the wrinkle. The notification information is used to notify a user that there is a wrinkle, or to notify the user of a position of the wrinkle, or the like.

In addition, the camera 193 shown in FIG. 1 may include one to N cameras. If one camera is included (or a plurality of cameras are included, but only one camera is enabled at a time), the mobile phone 100 only needs to perform wrinkle detection on a face image acquired by the camera (or the camera enabled at the current moment). If a plurality of cameras are included, and the plurality of cameras are enabled at the same time, the mobile phone 100 may perform wrinkle detection on a face image acquired by each camera (enabled camera).

The internal memory 121 may be configured to store computer-executable program code. The executable program code includes an instruction. The processor 110 runs the instruction stored in the internal memory 121, to execute various function applications and data processing of the mobile phone 100. The internal memory 121 may include a program storage region and a data storage region. The program storage region may store an operating system, code of an application program (for example, a camera application or a WeChat application), and the like. The data storage region may store data (for example, an image or a video acquired by the camera application) created in a use process of the mobile phone 100, and the like. The internal memory 121 may further store code of the wrinkle detection algorithm provided in the embodiments of this application. When the code of the wrinkle detection algorithm stored in the internal memory 121 is run by the processor 110, a wrinkle detection function is implemented.

In addition, the internal memory 121 may include a high-speed random access memory, and may further include a non-volatile memory, for example, at least one disk storage device, a flash memory device, or a universal flash storage (universal flash storage, UFS).

Certainly, the code of the wrinkle detection algorithm provided in the embodiments of this application may alternatively be stored in an external memory. In this case, the processor 110 may run, by using the external memory interface 120, the code of the wrinkle detection algorithm stored in the external memory, to implement a corresponding wrinkle detection function.

The following describes a function of the sensor module 180.

The distance sensor 180F is configured to measure a distance. The mobile phone 100 may measure a distance by using infrared or laser. In some embodiments, for a photographed scene, the mobile phone 100 may measure a distance by using the distance sensor 180F, to implement fast focusing. In some other embodiments, the mobile phone 100 may further detect, by using the distance sensor 180F, whether a person or an object approaches.

The optical proximity sensor 180G may include, for example, a light-emitting diode (LED) and an optical detector, for example, a photodiode. The light-emitting diode may be an infrared light-emitting diode. The mobile phone 100 emits infrared light by using the light-emitting diode. The mobile phone 100 detects infrared reflected light from an object nearby by using the photodiode. When the detected reflected light is sufficient, it may be determined that there is an object near the mobile phone 100. When the detected reflected light is insufficient, the mobile phone 100 may determine that there is no object near the mobile phone 100. The mobile phone 100 may detect, by using the optical proximity sensor 180G, that the user holds the mobile phone 100 close to an ear to make/answer a call, to automatically turn off the screen for power saving. The optical proximity sensor 180G may also be configured to automatically unlock or lock the screen in a leather case mode or a pocket mode.

The fingerprint sensor 180H is configured to collect a fingerprint. The mobile phone 100 may implement fingerprint unlocking, application access locking, fingerprint photographing, fingerprint call answering, and the like by using a feature of the collected fingerprint.

The temperature sensor 180J is configured to detect a temperature. In some embodiments, the mobile phone 100 executes a temperature processing policy by using the temperature detected by the temperature sensor 180J.

The touch sensor 180K is also referred to as a "touch panel". The touch sensor 180K may be disposed on the display screen 194. The touch sensor 180K and the display screen 194 constitute a touchscreen, also referred to as a "touch control screen". The touch sensor 180K is configured to detect a touch operation on or near the touch sensor. The touch sensor may transfer the detected touch operation to the application processor to determine a type of a touch event. A visual output related to the touch operation may be provided by using the display screen 194. In some other embodiments, the touch sensor 180K may alternatively be disposed on a surface of the mobile phone 100 at a position different from that of the display screen 194.

A wireless communication function of the mobile phone 100 may be implemented by using the antenna 1, the antenna 2, the mobile communication module 151, the wireless communication module 152, the modem processor, the baseband processor, and the like.

The antenna 1 and the antenna 2 are configured to transmit and receive electromagnetic wave signals. Each antenna in the terminal device 100 may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 151 may provide a solution for wireless communication including 2G/3G/4G/5G and the like to be applied to the terminal device 100. The mobile communication module 151 may include at least one filter, switch, power amplifier, low noise amplifier (low noise amplifier, LNA), and the like. The mobile communication module 151 may receive an electromagnetic wave by using the antenna 1, perform processing such as filtering or amplification on the received electromagnetic wave, and transfer the electromagnetic wave to the modem processor for demodulation. The mobile communication module 150 may further amplify a signal modulated by the modem processor, and convert the signal into an electromagnetic wave for radiation by using the antenna 1. In some embodiments, at least some function modules in the mobile communication module 151 may be disposed in the processor 110. In some embodiments, at least some function modules in the mobile communication module 151 may be disposed in a same device as at least some modules in the processor 110.

The modem processor may include a modulator and a demodulator. The modulator is configured to modulate a to-be-sent low-frequency baseband signal into an intermediate or high-frequency signal. The demodulator is configured to demodulate a received electromagnetic wave signal into a low-frequency baseband signal. Then the demodulator transfers the low-frequency baseband signal obtained through the demodulation to the baseband processor for processing. The low-frequency baseband signal is processed by the baseband processor and then transferred to the application processor. The application processor outputs a sound signal by using an audio device (which is not limited to the speaker 170A, the phone receiver 170B, or the like), or displays an image or a video by using the display screen 194. In some embodiments, the modem processor may be an independent device. In some other embodiments, the modem processor may be independent of the processor 110, and is disposed in a same device as the mobile communication module 150 or another function module.

The wireless communication module 152 may provide a solution for wireless communication including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like to be applied to the terminal device 100. The wireless communication module 152 may be one or more devices integrating at least one communication processing module. The wireless communication module 152 receives an electromagnetic wave by using the antenna 2, performs frequency modulation and filtering processing on the electromagnetic wave signal, and sends the processed signal to the processor 110. The wireless communication module 152 may further receive a to-be-sent signal from the processor 110, perform frequency modulation and amplification on the to-be-sent signal, and convert the to-be-sent signal into an electromagnetic wave for radiation by using the antenna 2.

In some embodiments of this application, the mobile phone 100 may receive, by using the wireless communication module 151 or the wireless communication module 152, a face image sent by another device, and then run the wrinkle detection algorithm provided in the embodiments of this application, to detect a wrinkle in the face image. In this case, the mobile phone 100 may not have an image acquisition function.

In addition, the mobile phone 100 may implement an audio function, for example, playing music or recording sound, by using the audio module 170, the speaker 170A, the phone receiver 170B, the microphone 170C, the headset interface 170D, the application processor, and the like. The mobile phone 100 may receive an input from the key 190, generate a key signal input that is related to user setting and function control of the mobile phone 100. The mobile phone 100 may generate a vibration notification (for example, an incoming call vibration notification) by using the motor 191. The indicator 192 in the mobile phone 100 may be an indicator light, which may be configured to indicate a charging status and a battery level change, and may also be configured to indicate a message, a missed call, a notification, and the like. The SIM card interface 195 in the mobile phone 100 is configured to connect to a SIM card. The SIM card may be inserted into the SIM card interface 195 and removed from the SIM card interface 195, to contact and separate from the mobile phone 100.

It should be understood that, in actual application, the mobile phone 100 may include more or fewer components than those shown in FIG. 1.

For ease of describing the wrinkle detection algorithm provided in the embodiments of this application, the following describes the wrinkle detection algorithm in the embodiments of this application by using components related to the wrinkle detection algorithm provided in the embodiments of this application. For details, refer to FIG. 2. For components in FIG. 2, refer to related descriptions about FIG. 1. It should be noted that, in FIG. 2, for example, the processor 110 is integrated with an application processor 110-1.

In some embodiments of this application, a wrinkle detection process of the mobile phone 100 shown in FIG. 2 may be as follows:

For example, the wrinkle detection function is integrated into the camera application. The display screen 194 (referring to FIG. 1) of the mobile phone 100 displays a home screen. The home screen includes icons of a plurality of applications (for example, the camera application and the WeChat application). The user taps an icon of the camera application in the home screen by touching the sensor 180K, to trigger the application processor 110-1 to start the camera application and turn on the camera 193. The display 194 displays an interface of the camera application, for example, a viewfinder interface. A lens group 193-1 in the camera 193 collects an optical signal reflected by a to-be-photographed object (for example, a face), and transfers the collected optical signal to an image sensor 193-2. The image sensor 193-2 generates an original image (the original image includes the face) of the to-be-photographed object based on the optical signal.

The image sensor 193-2 sends the original image to the application processor 110-1. The application processor 110-1 runs the code of the wrinkle detection algorithm provided in the embodiments of this application (for example, the application processor 110-1 runs the code of the wrinkle detection algorithm stored in the internal memory 121), to detect a wrinkle in the original image. After detecting a wrinkle, the application processor 110-1 may output notification information (for example, display text information in the viewfinder interface). The notification information may be used to mark a position of the wrinkle on the original image, or the like. Certainly, if no wrinkle is detected, the application processor 110-1 may output notification information to notify the user that no wrinkle is detected.

It should be understood that the wrinkle detection method provided in the embodiments of this application may be applied to detection of a wrinkle (for example, nasolabial folds or crow's feet on a face) on any body part (for example, a face). The following describes how to detect a nasolabial fold on a face for example.

Figure 3:
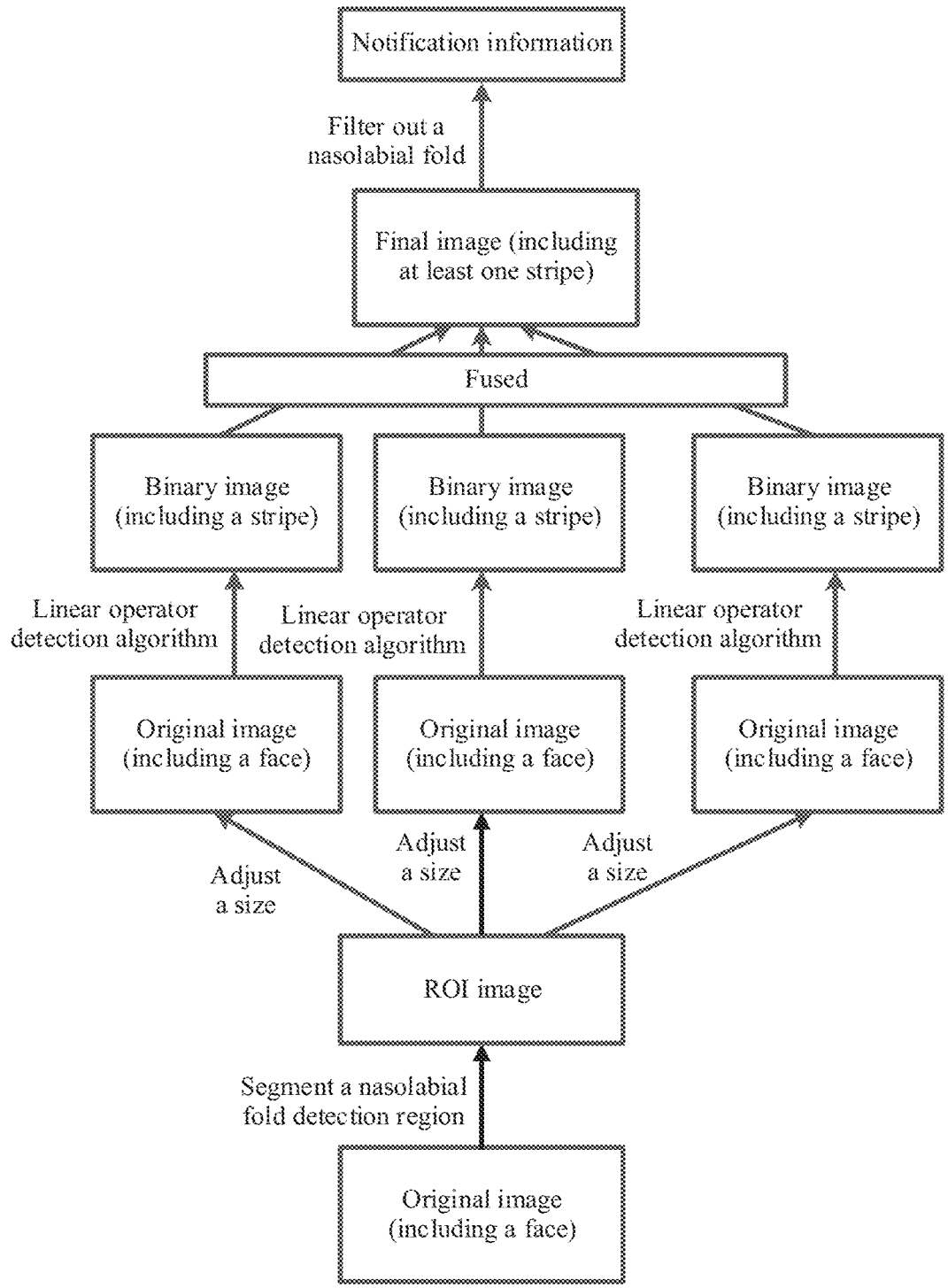
FIG. 3 is a schematic flowchart of a wrinkle detection method according to an embodiment of this application.

FIG. 3 shows a process in which the application processor 110-1 runs the code of the wrinkle detection algorithm to detect a wrinkle. As shown in FIG. 3, the application processor 110-1 segments a nasolabial fold detection region from an original image (including a face), to obtain an ROI image. The application processor 110-1 adjusts a size of the ROI image to obtain at least two ROI images of different sizes (three images are used as an example in FIG. 3). The application processor 110-1 processes all the ROI images of different sizes based on a linear operator detection algorithm, to obtain three binary images. Each binary image includes a stripe. The application processor 110-1 fuses the three binary images to obtain a final image. The final image includes at least one stripe. The application processor 110-1 filters out one or more stripes from the final image. The one or more stripes are nasolabial folds.

It can be learned from the foregoing description that, in the wrinkle detection method provided in this embodiment of this application, a wrinkle can be detected by simply shooting an image including a face, without a complex operation process, thereby facilitating operations. In addition, the wrinkle detection function can be integrated on a portable terminal device such as a mobile phone or an ipad, thereby achieving high universality.

The following describes, by still using nasolabial fold detection on an original image as an example, a process in which the application processor 110-1 runs the code of the wrinkle detection algorithm provided in the embodiments of this application to detect a wrinkle on the original image.

Figure 4:
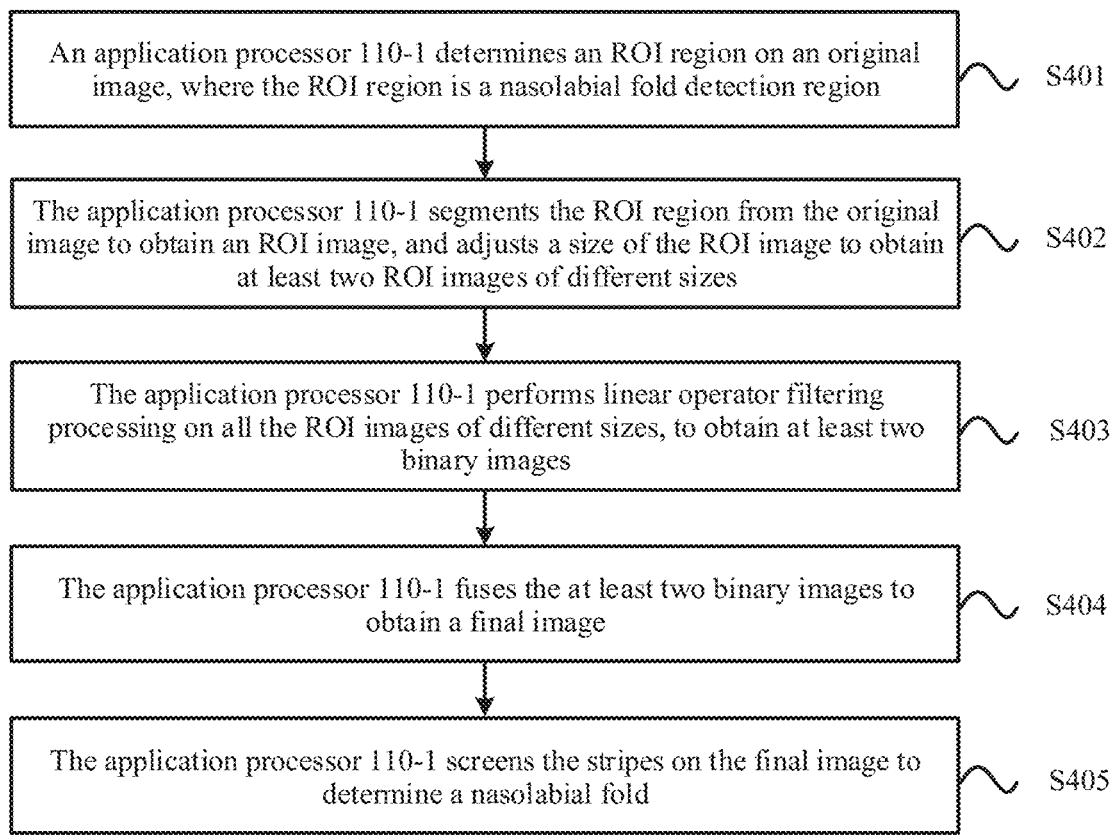
FIG. 4 is a schematic flowchart of a wrinkle detection method according to an embodiment of this application.

FIG. 4 is a schematic flowchart of a wrinkle detection method according to an embodiment of this application. As shown in FIG. 4, the process includes the following steps.

S401. The application processor 110-1 determines an ROI region on an original image, where the ROI region is a nasolabial fold detection region.

Optionally, S301 may be implemented in the following several steps:

First step: The application processor 110-1 determines a key point on the original image based on a key point detection algorithm. The key point is used to indicate a point of a feature part of a face in the original image, and the feature part includes an eye, an eyebrow, a nose, and a mouth of the face, a facial contour, and the like.

The key point detection algorithm may be a deep learning-based face key point detection algorithm or another algorithm. This is not limited in this embodiment of this application.

Figure 5B:
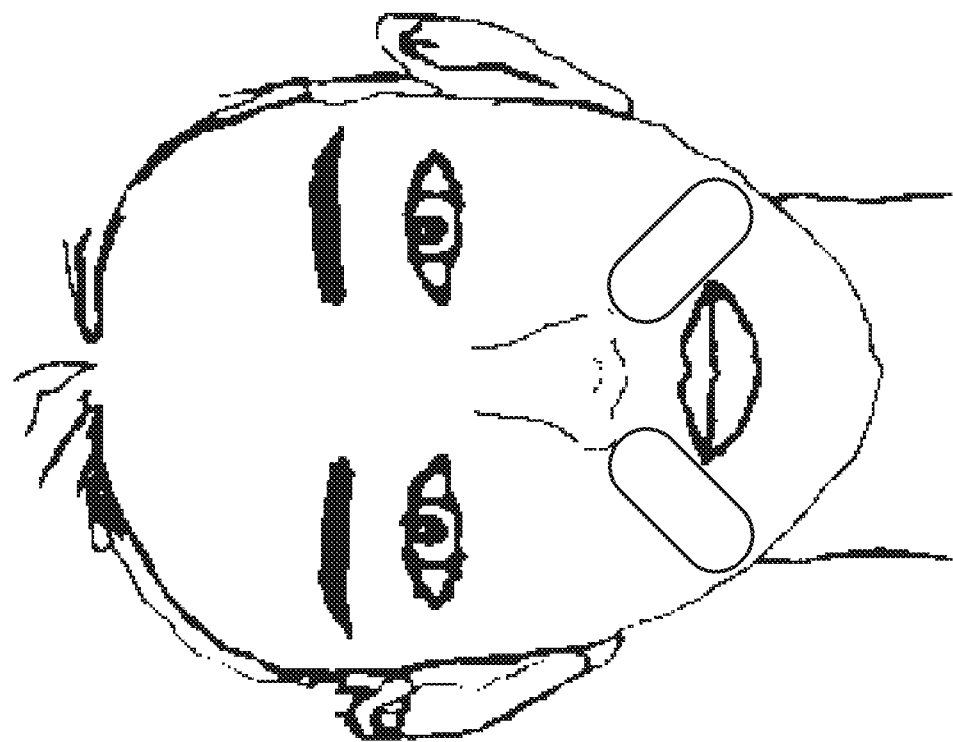
FIG. 5(a) and FIG. 5(b) are a schematic diagram of a nasolabial fold detection region on an original image according to an embodiment of this application.
Figure 5A:
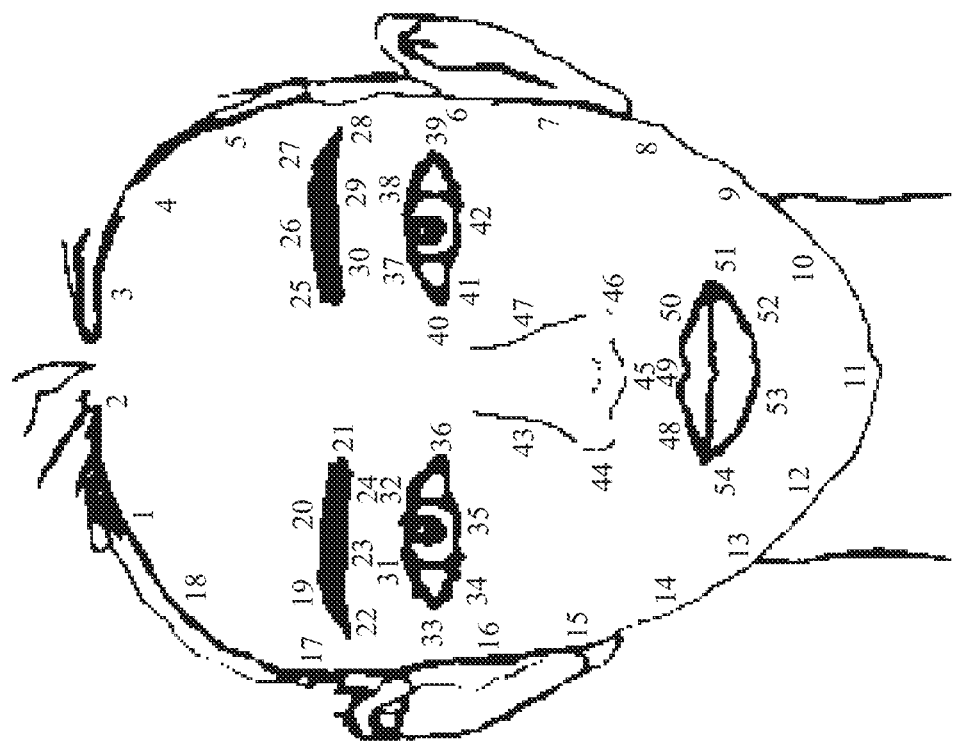

FIG. 5(a) and FIG. 5(b) are a schematic diagram of a key point on an original image according to an embodiment of this application. As shown in FIG. 5(a), a plurality of key points (the application processor 110-1 may number each key point) on the original image are distributed at feature parts (the eyes, eyebrows, nose, mouth, and facial contour).

Second step: The application processor 110-1 determines a nasolabial fold detection region based on the key point.

Further, as shown in FIG. 5(a), the application processor 110-1 determines a nasolabial fold detection region, namely, an ROI region, that is, a region in an ellipse box in FIG. 5(b), based on key points 44, 48, 54, 14, 13, 128, and the like.

The foregoing first step and second step describe a possible implementation of determining a nasolabial fold detection region on the original image by the application processor 110-1. In actual application, the application processor 110-1 may alternatively determine a nasolabial fold detection region on the image in another manner. This is not limited in this embodiment of this application.

S402. The application processor 110-1 segments the ROI region from the original image to obtain an ROI image, and adjusts a size of the ROI image to obtain at least two ROI images of different sizes.

Figure 6:
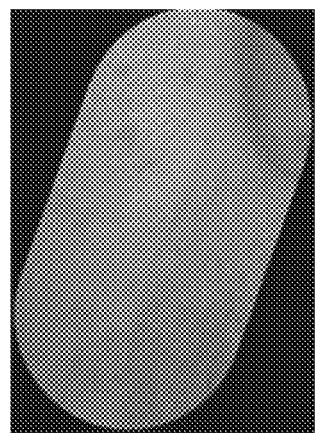
FIG. 6 is a schematic diagram of an ROI image segmented from an original image according to an embodiment of this application.

Referring to FIG. 5(b), after determining the ROI region (the region in the ellipse box), the application processor 110-1 may perform segmentation based on the ROI region to obtain an ROI image, referring to FIG. 6 (generally, the ROI image in FIG. 6 is colored). In this way, in a subsequent process, the application processor 110-1 only needs to process the region obtained through segmentation, rather than needs to process the entire image, thereby reducing a computation amount.

After performing segmentation based on the ROI region and obtaining the ROI image, the application processor 110-1 may scale the ROI image to obtain at least two ROI images of different sizes.

Optionally, the application processor 110-1 may further preprocess the ROI image. A process of preprocessing the ROI image may be performed before or after the application processor obtains the ROI image through segmentation (if the process is performed before the ROI image is obtained through segmentation, only the ROI region is preprocessed, or the entire image may be preprocessed). Certainly, the application processor 110-1 may alternatively preprocess, after the application processor 110-1 scales the ROI image and obtains the at least two ROI images of different sizes, all the ROI images of different sizes.

Figure 7:
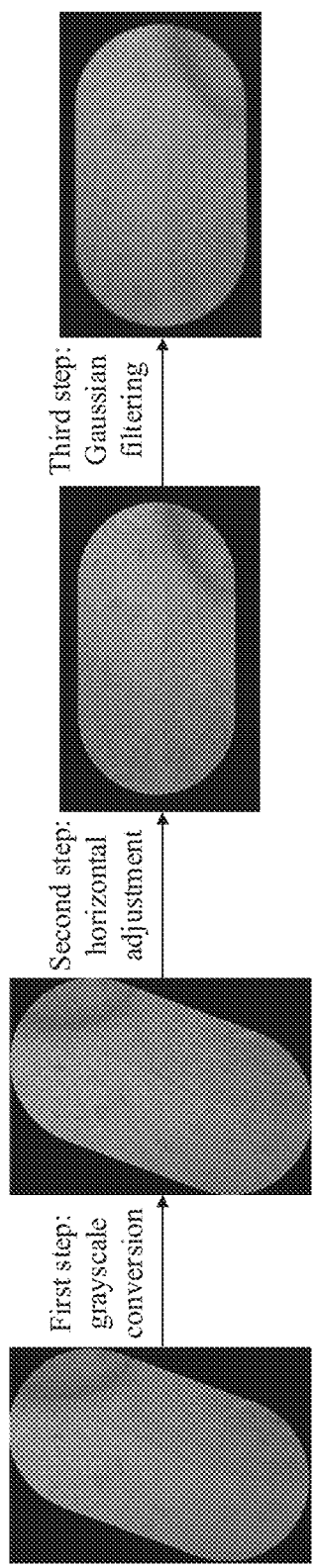
FIG. 7 is a schematic flowchart of preprocessing an ROI image according to an embodiment of this application.

Herein, for example, the application processor 110-1 preprocesses each ROI image after obtaining the ROI image through segmentation. A process of preprocessing the ROI image by the application processor 110-1 may be as follows:

FIG. 7 is a schematic flowchart of preprocessing an ROI image according to an embodiment of this application.

First step: The application processor 110-1 performs grayscale processing on the ROI image, that is, converts the ROI image from a color image to a grayscale image (for example, the ROI image in FIG. 6 is colored, and the first step in FIG. 7 is to convert the color ROI image to grayscale). Second step: The application processor 110-1 horizontally adjusts the ROI image. Third step: The application processor 110-1 denoises the ROI image. In the third step, the application processor 110-1 may perform filtering processing on the ROI image in an existing manner, for example, a Gaussian filtering method.

FIG. 7 shows only an example in which the application processor 110-1 preprocesses the ROI image. In actual application, in addition to the preprocessing steps shown in FIG. 7, another preprocessing step, for example, filtering impact of pores and micro hairs in the ROI image, may be further included. This is not limited in this embodiment of this application.

S403. The application processor 110-1 performs linear operator filtering processing on all the ROI images of different sizes, to obtain at least two binary images.

Figure 8:
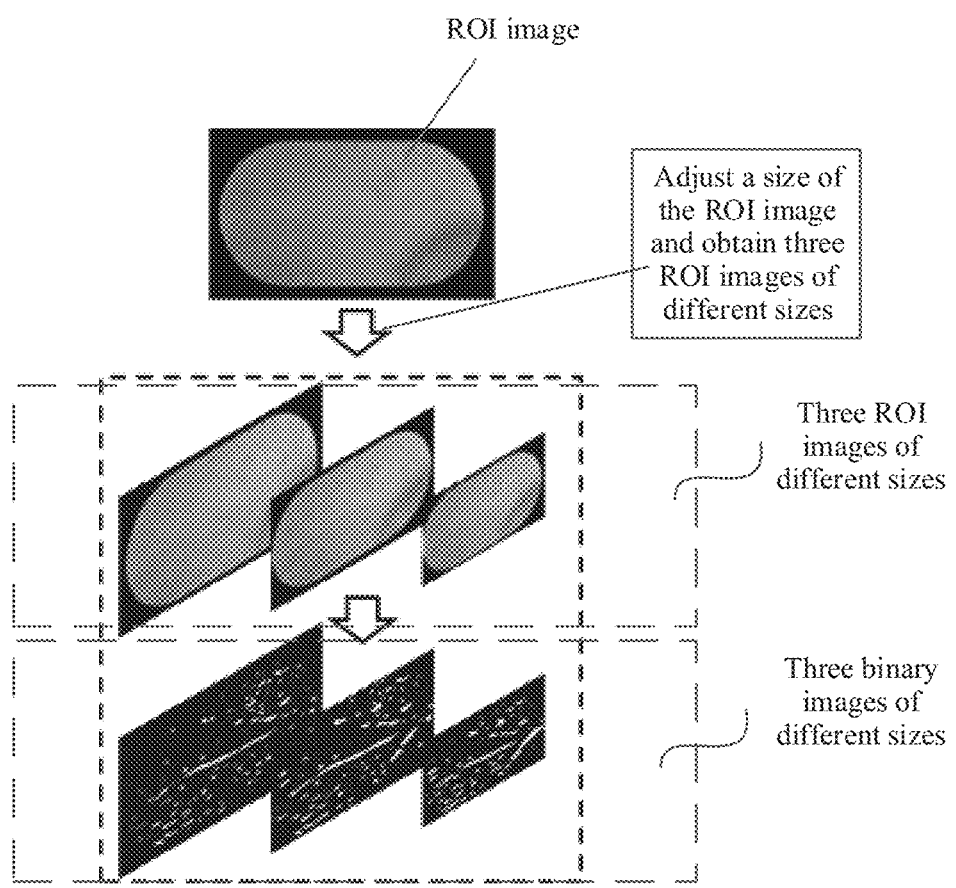
FIG. 8 is a schematic flowchart of adjusting a size of an ROI image according to an embodiment of this application.

It can be learned from the foregoing content that the application processor 110-1 adjusts the size of the ROI image to obtain at least two ROI images of different sizes. In the following, for example, the application processor 110-1 adjusts the size of the ROI image and obtains three ROI images of different sizes. Referring to FIG. 8, the application processor 110-1 performs linear operator filtering processing on all the three ROI images of different sizes, to obtain three binary images.

The following describes, by using one of the three ROI images of different sizes as an example, a process in which the application processor 110-1 performs linear operator filtering processing on the ROI image to obtain a binary image. Processing processes of the other two binary images are the same, and details are not described herein again.

Figure 9:
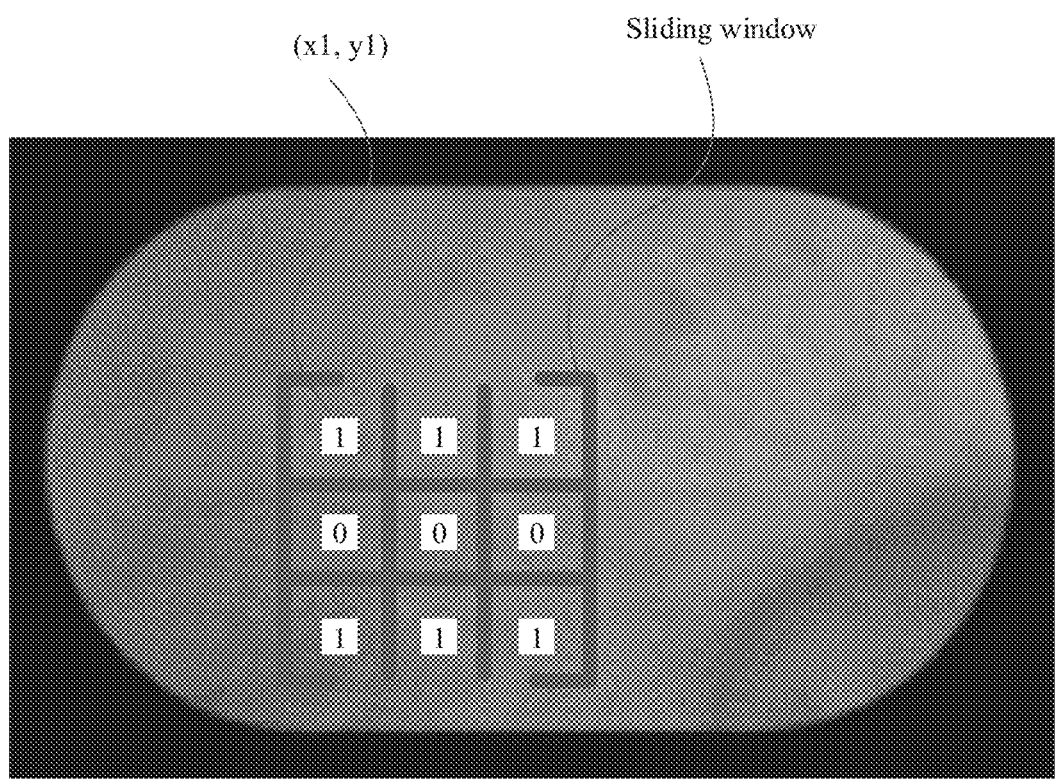
FIG. 9 is a schematic diagram of a matrix covering an image block of an ROI image according to an embodiment of this application.

FIG. 9 is a schematic diagram of linear operator filtering processing on an ROI image according to an embodiment of this application. Specifically, the process of performing linear operator filtering processing on the ROI image is as follows:

First step: The application processor 110-1 "sets" a linear operator (a preset matrix) on the ROI image. In other words, the preset matrix "covers" an image block on the ROI image.

As shown in FIG. 9, the linear operator is in a form of a matrix, and each matrix element in the matrix may correspond to a coordinate position. For example, as shown in FIG. 9, the matrix is a 3*3 matrix. A matrix element (with a value of 1) in the first row and the first column corresponds to coordinates (x1, y1), a matrix element (1) in the first row and the second column corresponds to coordinates (x2, y1), and so on.

Second step: The application processor 110-1 determines a pixel value corresponding to position coordinates of each matrix element.

Further, as shown in FIG. 9, each matrix element in the matrix corresponds to a pixel on the image block covered by the matrix. For example, the matrix element in the first row and the first column corresponds to a pixel whose coordinates are (x1, y1) on the image block, the matrix element in the first row and the second column corresponds to a pixel whose coordinates are (x2, y1) on the image block, and so on. Therefore, the application processor 110-1 determines a pixel value corresponding to the matrix element in the first row and the first column (assuming that the pixel value is p11), determines a pixel value corresponding to the matrix element in the first row and the second column (assuming that the pixel value is p12), and so on.

Third step: The application processor 110-1 multiplies a value of each matrix element by the pixel value corresponding to the matrix element. For example, if a value of the matrix element in the first row and the first column is 1, and a pixel value corresponding to the matrix element is p11, a product is 1*p11; if a value of the matrix element in the first row and the second column is 1, and a pixel value corresponding to the matrix element is p12, a product is 1*p12; and so on. The application processor 110-1 obtains 3*3=9 products.

Fourth step: The application processor 110-1 obtains a sum of the nine products to obtain a pixel value at a center position of the image block covered by the matrix.

A formula in the third step and the fourth step is as follows:

$$1*p11+1*p12+1*p13+0*p21+0*p22+0*p23+1*p31+1*p32+1*p33$$

where p11, p12, p13, p21, p22, p23, p31, p32, and p33 are pixel values of pixels corresponding to all matrix elements, respectively.

Through the first step to the fourth step, the application processor 110-1 can determine the pixel value at the center position of the image block covered by the matrix (the linear operator).

Figures 10, 11:
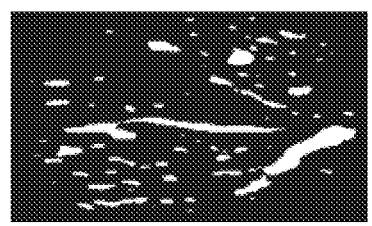
FIG. 10 is a schematic diagram of a 15*15 matrix according to an embodiment of this application.
FIG. 11 is a schematic diagram of a final image according to an embodiment of this application.

It should be noted that the first step to the fourth step use an example in which the matrix is a 3*3 matrix. Actually, the matrix may be an n*n matrix (n is an odd number greater than or equal to 3, such as 3, 5, 7, 9, 11, or 15). FIG. 10 is a schematic diagram of a 15*15 matrix. Values of matrix elements in each row are the same. For example, values of matrix elements in the first row are 1. A value of a matrix element increases from a center row (for example, the eighth row) of the matrix to other rows. In other words, a value of a matrix element in the center row is the smallest.

The foregoing four steps describe a process in which the application processor 110-1 determines a pixel value at a center position of an image block covered by a matrix when the application processor 110-1 sets the matrix at a position on the ROI image. When the matrix moves from the position to a next position, the matrix covers another image block. The application processor 110-1 may determine a pixel value at a center position of a next image block in a similar manner. Therefore, the application processor 110-1 obtains a plurality of pixel values at center positions that are determined by the matrix covering different image blocks.

Fifth step: The application processor 110-1 sets, in the plurality of pixel values at the center positions, a coordinate point corresponding to a pixel value greater than a preset pixel value (for example, 300) to black, and a coordinate point corresponding to a pixel value less than or equal to the preset pixel value to white. Therefore, the application processor 110-1 converts the ROI image into a binary image.

It should be noted that in the foregoing process, the ROI image is scaled and the matrix remains unchanged to determine pixels at center positions of different image blocks on the ROI image. In actual application, alternatively, the ROI image may remain unchanged, in other words, the size of the ROI image is not adjusted, while the matrix may be changed. For example, the mobile phone 100 may store a plurality of matrices: a 3*3 matrix, a 5*5 matrix, and a 15*15 matrix. Then, the foregoing process is separately performed by using the 3*3 matrix, the 5*5 matrix, and the 15*15 matrix (the three matrices are separately used for the same ROI image).

The foregoing describes a process in which the mobile phone 100 processes one of the three ROI images of different sizes in FIG. 8 to obtain a binary image. For the other two ROI images, a similar manner is used to obtain two binary images. Therefore, the application processor 110-1 obtains a total of three binary images (as shown in FIG. 8). A white region (referred to as a stripe below) on each binary image is a region in which a nasolabial fold may appear.

S404. The application processor 110-1 fuses the at least two binary images to obtain a final image.

During image fusion, if a stripe appears at a same position on M (M is greater than or equal to 2) of the at least two binary images, the application processor 110-1 retains the stripe. If only one of the at least two binary images has a stripe at a position, and there is no stripe at the position on other binary images, the stripe is deleted. Therefore, the final image obtained by the application processor 110-1 includes at least one stripe. FIG. 11 is a schematic diagram of a final image according to an embodiment of this application. As shown in FIG. 11, the image includes white regions (stripes).

S405. The application processor 110-1 screens the stripes on the final image to determine a nasolabial fold.

Figure 12:
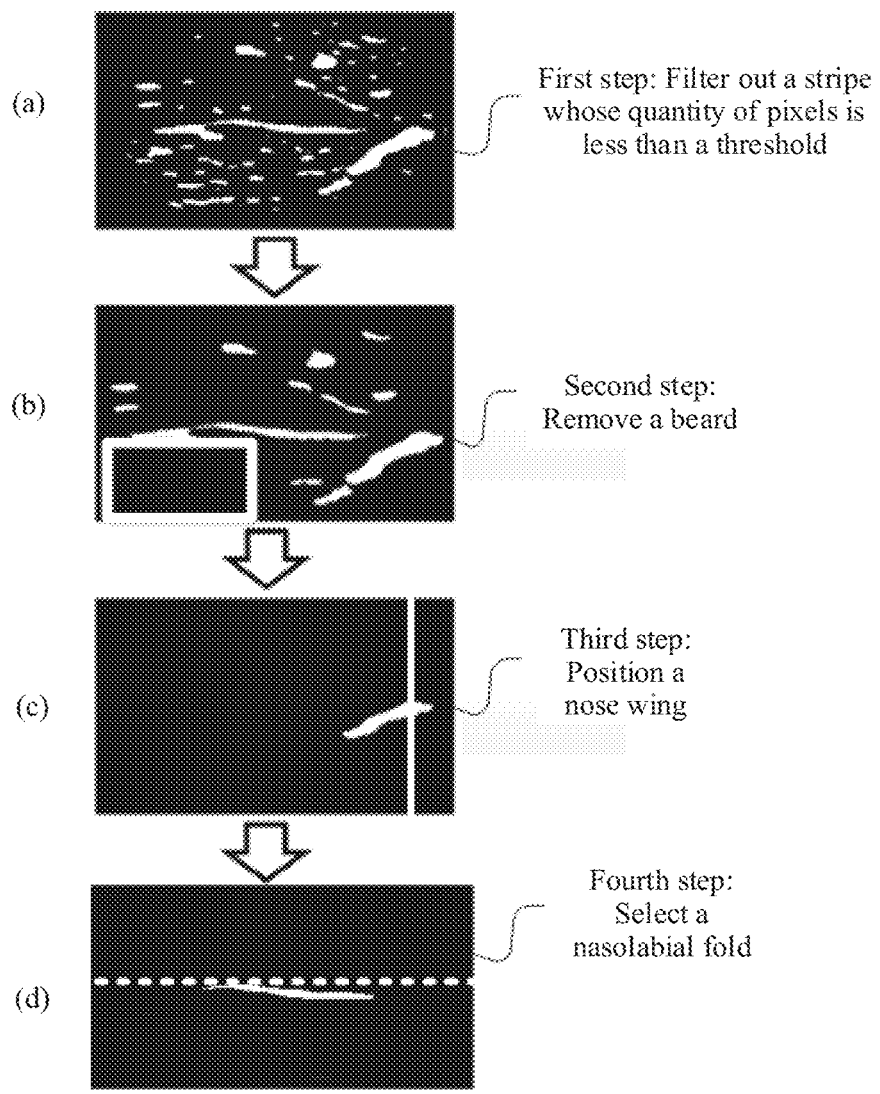
FIG. 12 is a schematic flowchart of filtering out a nasolabial fold in a final image according to an embodiment of this application.

Optionally, a process of S405 may be as follows:

First step: The application processor 110-1 filters out a stripe that is in the final image and whose quantity of pixels is less than a preset quantity of pixels. As shown in (a) in FIG. 12, the application processor 110-1 filters out stripes in the final image that have a relatively small quantity of pixels (white regions with a relatively small area), to obtain an image shown in (b) in FIG. 12.

Second step: Remove hair (a beard). The application processor 110-1 determines, in the image shown in (b) in FIG. 12, a region in which a beard may appear, for example, a white-framed region in (b) in FIG. 12 (it should be noted that the white-framed region is different from the white region, namely, the stripe; in the white region, a pixel value of a pixel is set to white, while the white-framed region is for ease of understanding by a reader, which is a box marking a region in which a beard may appear in an image). The application processor 110-1 determines all white regions (stripes) that intersect the red-framed region, and determines a ratio of a quantity of pixels of each stripe that are in the red-framed region to a quantity of all pixels of the stripe. For example, if a stripe intersects the red-framed region, a quantity of pixels of the stripe that are in the red-framed region is K, and a quantity of all pixels in the stripe is J, a ratio is K/J. Each stripe that intersects the red-framed region has a corresponding ratio.

If a ratio corresponding to a stripe is greater than a preset ratio, the application processor 110-1 determines that the stripe is a beard, and deletes the stripe. The preset ratio may be (1-n/m), where n is a quantity of all the stripes intersecting with the red frame, and m is a fixed value, for example, 10.

It should be noted that generally, when the original image acquired by the mobile phone 100 includes a face, there is a beard or hair in a nasolabial fold region of the face. After the original image is converted into a binary image, the beard or the hair is converted into a stripe (a white region). Therefore, to improve accuracy of nasolabial fold detection, the mobile phone 100 may filter out the stripe corresponding to the beard or the hair. In the foregoing threshold ratio formula, a larger value of n indicates more stripes intersecting the red-framed region, and it is considered that there are more beards. Therefore, the preset ratio is smaller. Provided that a ratio corresponding to a stripe is greater than the preset ratio, the stripe is deleted, so that accuracy of hair (beard) removal is improved.

Second step: Position a nose wing. As shown in (c) in FIG. 12, the application processor 110-1 finds, in a bottom-to-top direction from a point whose distance (for example, a distance from a white vertical solid line to a right border of the image, where it should be noted that the white solid line is different from the white region, namely, the stripe, and is a straight line marked for ease of understanding by a reader) to the right of the image is t time (t<1, generally 0.2) of an image width, the first stripe whose area is greater than a preset area, which is a nose wing.

Generally, a compared area occupies a relatively large proportion of the image. In addition, in the foregoing process, after the application processor 110-1 horizontally rotates the ROI image, the nose wing is located on the right of the image. Therefore, the application processor 110-1 determines a position of the nose wing on the right of the image, so that accuracy of nose wing positioning is improved. Certainly, in an actual application, the application processor 110-1 may alternatively determine the position of the nose wing in another manner.

Third step: Select a nasolabial fold. The application processor 110-1 selects, from the image shown in (c) in FIG. 12, one or more stripes whose length is greater than a preset length. Using a horizontal line (as shown by a white horizontal dashed line in (d) in FIG. 12) above the nose wing as a boundary, the application processor 110-1 determines a stripe located within a threshold range above or below the white horizontal dashed line. The white horizontal dashed line in (d) in FIG. 12 may be a mid-perpendicular line of the white vertical solid line in (c) in FIG. 12, or a straight line above the nose perpendicular to the white vertical solid line.

Optionally, when determining that there are a plurality of stripes located within the threshold range above or below the white horizontal dashed line, the application processor 110-1 may delete a stripe located on the left or upper left of the image to finally determine a nasolabial fold (because a probability that the nasolabial fold appears on the lower right of the image is greater than a probability that the nasolabial fold appears on the upper left).

The foregoing content describes a process in which the mobile phone 100 detects a nasolabial fold of a face in an original image. In some other embodiments of this application, after detecting the nasolabial fold, the mobile phone 100 may further evaluate the detected nasolabial fold. For example, the processor 110 in the mobile phone 100 may score severity of the nasolabial fold. In an example, a scoring process of the processor 110 is as follows:

The application processor 110-1 scores the nasolabial fold based on a preset formula. The preset formula is as follows:

nasolabial fold score $y = w1*x1 + w2*x2 + w3*x3 + w4*x4 + w5*x5 + w6*x6 + b$ where x1 represents an average width of all stripes, x2 represents an average length of all the stripes, x3 represents an average internal and external color contrast of all the stripes, x4 represents a ratio of a quantity of pixels of all the stripes to a total quantity of pixels of the ROI image, x5 represents a length of a longest stripe; x6 represents a width of the longest stripe, and b represents a bias.

Values of w1 to w6 and b may be preset. For example, the values of w1 to w6 and b may be determined in the following manner.

Before the mobile phone 100 is delivered from the factory, a designer acquires an image, and tests the image by using the wrinkle detection algorithm provided in the embodiments of this application. The designer manually scores a nasolabial fold in the image. In other words, a nasolabial fold score y is known. After one or more stripes (nasolabial folds) are detected by using the wrinkle detection method, values of x1 to x6 may be determined. In this way, one image corresponds to one y and one group of x1 to x6, and each of a plurality of images corresponds to one y and one group of x1 to x6. For an $i^{th}$ image, it is assumed that $Xi=[x1, x2, \ldots, x6, 1]\hat{\ }T$, which is a 7*1 vector. T represents a known transpose matrix, yi represents a nasolabial fold score of the image, and $W=[w1, w2, \ldots, w6, b]\hat{\ }T$. Assuming that there are k images, a matrix $X=[X1, X2, \ldots, Xk]\hat{\ }T$ is obtained, which is a k*7 sample matrix (known), and a corresponding score $Y=[y1, y2, \ldots, yk]\hat{\ }T$ (known). By solving an equation $Y=X*W$, $W=(X\hat{\ }T*X)\hat{\ }(-1)*X\hat{\ }T*y$ can be obtained.

Therefore, unknown w1 to w6 and b may be determined by using the foregoing process. After being determined, the values of w1 to w6 and b are stored in the internal memory 121 (shown in FIG. 1) of the mobile phone 100. In a subsequent scoring process, the processor 110 may read the values of w1 to w6 and b from the internal memory 121 as required for use.

It should be noted that the foregoing content is all described by using an example in which the mobile phone 100 detects a nasolabial fold on a face in an original image. Actually, the method is further applicable to detection of other wrinkles, for example, detection of crow's feet.

The wrinkle detection algorithm provided in the embodiments of this application is applicable to any scenario in which an image can be acquired. For example, a wrinkle detection control is configured in the camera application of the mobile phone 100. When the control is activated, the mobile phone 100 detects a wrinkle on an acquired face image by using the wrinkle detection algorithm. Alternatively, an app (built in the mobile phone 100 before delivery or downloaded from a network side in a use process of the mobile phone 100) dedicated for wrinkle detection may be installed in the mobile phone 100. When running the app, the mobile phone 100 detects a wrinkle on a face image by using the wrinkle detection algorithm. Alternatively, the wrinkle detection algorithm may be integrated into another app, for example, a beauty camera. This is not limited in this embodiment of this application.

Certainly, the wrinkle detection method may be further applied to the face unlocking field. For example, a face image stored in the mobile phone 100 has a nasolabial fold. When the user wants to unlock the mobile phone 100, the mobile phone 100 detects a face image, and may detect a nasolabial fold in the acquired face image by using the wrinkle detection method. If the nasolabial fold matches the nasolabial fold in the stored image (certainly, whether another part, for example, an eye, on the acquired image matches an eye on the stored image may be determined synchronously), the device is unlocked. This helps improve accuracy of face unlocking, and improve device security.

The wrinkle detection algorithm may be further applied to the fields such as face payment and face clocking. For example, during face payment, the mobile phone 100 displays a payment verification interface. A viewfinder box is displayed in the payment verification interface. After the mobile phone 100 acquires a face image (the face image is displayed in the viewfinder box), and detects a wrinkle on the face image, the detected wrinkle may be compared with a wrinkle in the stored image (certainly, another part, for example, an eye, on the acquired image may be synchronously compared with an eye on the stored image to determine whether the two match). If the two match, a payment process is performed. If the two do not match, notification information is displayed, to notify the user that the payment fails. In this manner, payment security can be improved.

The wrinkle detection algorithm provided in the embodiments of this application is further applicable to any scenario of detecting a wrinkle on an image after the image is received from another device or a network layer. For example, in a WeChat chat record, after an image sent by another contact is received, a wrinkle may be detected by using the wrinkle detection algorithm.

The implementations of this application may be combined randomly to achieve different technical effects.

In the foregoing embodiments provided in this application, the method provided in the embodiments of this application is described from a perspective of a terminal device (the mobile phone 100) acting as an execution entity. To implement functions in the method provided in the foregoing embodiments of this application, the terminal may include a hardware structure and/or a software module, to implement the functions in a form of the hardware structure, the software module, or the hardware structure plus the software module. Whether one of the functions is implemented by using the hardware structure, the software module, or the hardware structure plus the software module depends on a specific application and a design constraint condition of a technical solution.

Based on a same idea, an embodiment of this application provides a terminal device. The terminal device can perform the methods in the embodiments shown in FIG. 3 and FIG. 4. The terminal device includes an image acquisition unit and a processing unit.

The image acquisition unit is configured to obtain an original image, where the original image includes a face. The processing unit is configured to adjust a size of an ROI region on the original image to obtain at least two ROI images of different sizes, where the ROI region is a region in which a wrinkle on the face is located. The processing unit is further configured to process all the at least two ROI images of different sizes to obtain at least two binary images, where a white region in each binary image is a region in which a wrinkle is suspected to appear. The processing unit is further configured to fuse the at least two binary images to obtain a final image, where a white region on the final image is recognized as a wrinkle.

These modules/units may be implemented by hardware, or may be implemented by hardware executing corresponding software.

Figure 2:
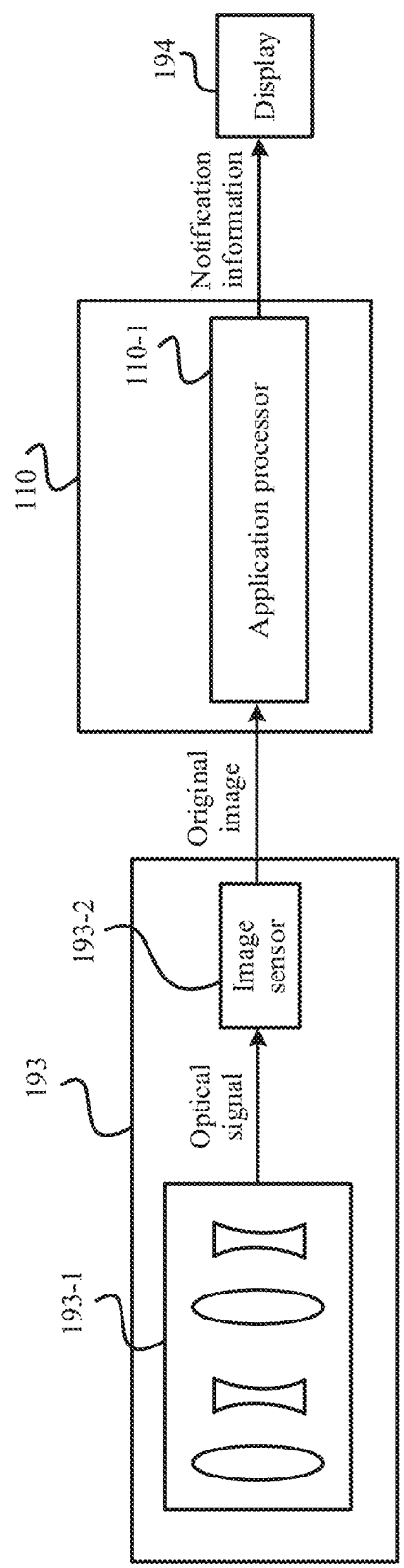
FIG. 2 is a schematic diagram of a mobile phone 100 according to an embodiment of this application.

When the terminal device is the mobile phone 100 shown in FIG. 1, the processing unit may be the processor 110 shown in FIG. 1, or the application processor 110-1 shown in FIG. 2, or another processor. The image acquisition unit may be the camera 193 shown in FIG. 1 or FIG. 2, or may be another image acquisition unit connected to the terminal device.

An embodiment of this application further provides a computer-readable storage medium. The storage medium may include a memory. The memory may store a program. When the program is executed, the electronic device is enabled to perform all the steps described in the method embodiments shown in FIG. 3 and FIG. 4.

An embodiment of this application further provides a computer program product. When the computer program product runs on an electronic device, the electronic device is enabled to perform all the steps described in the method embodiments shown in FIG. 3 and FIG. 4.

It should be noted that, in this embodiment of this application, unit division is an example, and is merely a logical function division. In actual implementation, another division manner may be used. Functional units in this embodiment of the present invention may be integrated into one processing unit, or each of the units may exist alone physically, or two or more units may be integrated into one unit. For example, in the foregoing embodiment, the first obtaining unit and the second obtaining unit may be a same unit or different units. The integrated unit may be implemented in a form of hardware, or may be implemented in a form of a software function unit.

According to the context, the term "when" used in the foregoing embodiments may be interpreted as a meaning of "if" or "after" or "in response to determining" or "in response to detecting". Similarly, according to the context, the phrase "when it is determined . . . that" or "if (a stated condition or event) is detected" may be interpreted as a meaning of "when it is determined . . . that" or "in response to determining" or "when (a stated condition or event) is detected" or "in response to detecting (a stated condition or event)".

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For a purpose of explanation, the foregoing description is described with reference to a specific embodiment. However, the foregoing example discussion is not intended to be detailed, and is not intended to limit this application to a disclosed precise form. According to the foregoing teaching content, many modification forms and variation forms are possible. Embodiments are selected and described to fully illustrate the principles of this application and practical application of the principles, so that other persons skilled in the art can make full use of this application and various embodiments that have various modifications applicable to conceived specific usage.

In the foregoing embodiments provided in this application, the method provided in the embodiments of this application is described from a perspective of a terminal device acting as an execution entity. To implement functions in the method provided in the foregoing embodiments of this application, the terminal device may include a hardware structure and/or a software module, to implement the functions in a form of the hardware structure, the software module, or the hardware structure plus the software module. Whether one of the functions is implemented by using the hardware structure, the software module, or the hardware structure plus the software module depends on a specific application and a design constraint condition of a technical solution.

What is claimed is:

1. A wrinkle detection method, comprises:
obtaining an original image, wherein the original image comprises a face;
adjusting a size of a region on the original image to obtain at least two region of interest (ROI) images of different sizes, wherein in the region a wrinkle on the face is located;
processing the at least two ROI images of different sizes to obtain at least two binary images, wherein a white region in each binary image of the at least two binary images is a region in which the wrinkle is suspected to appear, wherein the processing comprises:
for each ROI image of the at least two ROI images:
setting a pixel on the ROI image to be black or white based on a comparison between a pixel value of the pixel and a preset pixel value, wherein the pixel is located in an image block determined based on a preset matrix, and the pixel value is calculated based on the preset matrix; and
fusing the at least two binary images to obtain a final image, wherein a white region in the final image is recognized as the wrinkle.

2. The method of claim 1, wherein the processing comprises:
repeatedly performing the following steps for each ROI image:
covering the ROI image by using the preset matrix;
determining a pixel value of a pixel that is on the ROI image and that corresponds to each matrix element in the preset matrix;
determining a product of each matrix element and the pixel value of the pixel corresponding to each matrix element;
obtaining a sum of products corresponding to the matrix elements in the preset matrix, wherein the sum is a pixel value at a center position of an image block that is on the ROI image and that is covered by the preset matrix; and
setting the center position to black if the pixel value of the center position of the image block is greater than a preset pixel value, or setting, the center position to white if the pixel value of the center position of the image block is less than or equal to the preset pixel value.

3. The method of claim 1, wherein the method further comprises:
deleting the white region from M images, wherein M is less than or equal to a preset value, when the M images of the at least two binary images have a white region at a same position.

4. The method of claim 1, when the wrinkle is a nasolabial fold, wherein the method further comprises:
determining a region in which a beard is located on the final image;
determining n white regions that intersect the region in which the beard is located;
determining a ratio of a quantity of pixels in the region in which the beard is located in a first white region of the n white regions to a quantity of pixels in the first white region; and
deleting the first white region from the final image, when the ratio is greater than or equal to a preset ratio, wherein a remaining white region on the final image is recognized as a nasolabial fold, wherein the preset ratio is 1−n/m, and m is a preset fixed value.

5. The method of claim 1, when the wrinkle is a nasolabial fold, wherein the method further comprises:
determining a coordinate position of a nose wing in the final image; and
deleting from the final image, a white region that is within a preset distance range from the coordinate position and whose length is greater than a preset length, wherein a remaining white region on the final image is recognized as a nasolabial fold.

6. The method of claim 1, wherein the method further comprises:
converting the ROI image into a grayscale image;
horizontally adjusting the gray scale grayscale image; and
denoising the horizontally adjusted image.

7. The method of claim 1, wherein the method further comprises:
determining an evaluation result y of the white regions based on the following formula:

$$y=w1*x1+w2*x2+w3*x3+w4*x4+w5*x5+w6*x6+b$$

wherein x1 represents an average width of the white regions, x2 represents an average length of the white regions, x3 represents an average internal and external color contrast of the white regions, x4 represents a ratio of a quantity of pixels of the white regions to a total quantity of pixels of the ROI image, x5 and x6 respectively represent a length and a width of a longest white region in the white regions, and b represents a bias.

8. The method of claim 1, wherein the method further comprises:
displaying notification information in a viewfinder interface, wherein the notification information is used to notify a position of the wrinkle on the face.

9. The method of claim 1, wherein the method further comprises:
comparing the wrinkle with a wrinkle in a prestored image; and
performing screen unlocking when the wrinkle is consistent with the wrinkle in the prestored image.

10. The method of claim 1, wherein the method further comprises:
displaying a payment verification interface; and
comparing the wrinkle with a wrinkle in a prestored image; and
performing a payment process when the wrinkle is consistent with the wrinkle in the prestored image.

11. The method of claim 1, wherein the method further comprises:
outputting notification information when no wrinkle is detected.

12. An electronic device, comprising:
a non-transitory memory comprising instructions; and
at least one processor coupled to the non-transitory memory, the instructions being executed by the at least one processor to cause the electronic device to:

obtain an original image, wherein the original image comprises a face;

adjust a size of a region on the original image to obtain at least two region of interest (ROI) images of different sizes, wherein in the region a wrinkle on the face is located;

process the at least two ROI images of different sizes to obtain at least two binary images, wherein a white region in each binary image of the at least two binary images is a region in which the wrinkle is suspected to appear, wherein the processing comprises:

for each ROI image of the at least two ROI images:
setting a pixel on the ROI image to be black or white based on a comparison between a pixel value of the pixel and a preset pixel value, wherein the pixel is located in an image block determined based on a preset matrix, and the pixel value is calculated based on the preset matrix; and fuse the at least two binary images to obtain a final image, wherein a white region on the final image is recognized as the wrinkle.

13. The electronic device of claim 12, the instructions further cause the electronic device to:

repeatedly perform the following steps for each ROI image:

covering the ROI image by using the preset matrix;

determining a pixel value of a pixel that is on the ROI image and that corresponds to each matrix element in the preset matrix;

determining a product of each matrix element and the pixel value of the pixel corresponding to each matrix element;

obtaining a sum of products corresponding to the matrix elements in the preset matrix, wherein the sum is a pixel value at a center position of an image block that is on the ROI image and that is covered by the preset matrix; and setting the center position to black if the pixel value of the center position of the image block is greater than a preset pixel value, or setting, the center position to white if the pixel value of the center position of the image block is less than or equal to the preset pixel value.

14. The electronic device of claim 12, the instructions further cause the electronic device to:

delete the white region from M images, wherein M is less than or equal to a preset value, when the M images of the at least two binary images have a white region at a same position.

15. The electronic device of claim 12, the instructions further cause the electronic device to:

determine a region in which a beard is located on the final image;

determine n white regions that intersect the region in which the beard is located;

determine a ratio of a quantity of pixels in the region in which the beard is located in a first white region of the n white regions to a quantity of pixels in the first white region; and delete the first white region from the final image, when the ratio is greater than or equal to a preset ratio, wherein a remaining white region on the final image is recognized as a nasolabial fold, wherein the preset ratio is 1−n/m, and m is a preset fixed value.

16. The electronic device of claim 12, the instructions further cause the electronic device to:

determine a coordinate position of a nose wing in the final image; and delete from the final image, a white region that is within a preset distance range from the coordinate position and whose length is greater than a preset length, wherein a remaining white region on the final image is recognized as a nasolabial fold.

17. The electronic device of claim 12, the instructions further cause the electronic device to:

convert the ROI image into a grayscale image;

horizontally adjust the grayscale image; and denoise the horizontally adjusted image.

18. The electronic device of claim 12, the instructions further cause the electronic device to:

determine an evaluation result y of the white regions based on the following formula:

$$y = w1*x1 + w2*x2 + w3*x3 + w4*x4 + w5*x5 + w6*x6 + b$$

wherein x1 represents an average width of the white regions, x2 represents an average length of the white regions, x3 represents an average internal and external color contrast of the white regions, x4 represents a ratio of a quantity of pixels of the white regions to a total quantity of pixels of the ROI image, x5 and x6 respectively represent a length and a width of a longest white region in the white regions, and b represents a bias.

19. The electronic device of claim 12, the instructions further cause the electronic device to:

display notification information in a viewfinder interface, wherein the notification information is used to notify a position of the wrinkle on the face.

20. The electronic device of claim 12, the instructions further cause the electronic device to:

output notification information when no wrinkle is detected.

* * * * *